weight: 2,973,303
Patented Feb. 28, 1961

2,973,303

PROCESS FOR THE PRODUCTION OF CITRIC ACID BY THE FERMENTATION PROCESS

Shukuo Kinoshita, Katsunobu Tanaka, and Sadao Akita, Tokyo, Japan, assignors to Kyowa Hakko Kogyo Kabushiki Kaisha, Tokyo, Japan, a corporation of Japan No Drawing. Filed July 23, 1958, Ser. No. 750,290

6 Claims. (Cl. 195—36)

This invention relates to a process for the production of citric acid with a high yield by the fermentation of sugar materials, using a new strain belonging to the genus Penicillium discovered and isolated by the present inventors.

It is an object of this invention to obtain high yields of citric acid in a short time by a submerged culture using molasses or raw sugar. Prior to this invention molasses or raw sugar was considered difficult to use as an industrial raw material in such fermentation processes.

Many suggestions have hitherto been given to fermentation processes for the production of citric acid. These processes can be roughly classified into solid-culture processes and liquid-culture processes of moulds.

The former are so-called Koji type culture processes, wherein seed moulds are inoculated on solid raw materials such as starchy substances. The Koji type culture process has troublesome technical problems with respect to infection by miscellaneous microorganisms, control of the temperature of materials, ventilation, etc., so that stable fermentation can hardly be expected. As to the latter liquid-culture processes, a so-called surface-culture process, wherein moulds are inoculated on a liquid surface, is chiefly adopted. However, such surface-culture process involves a thin layer culture. Therefore, the amount of the actual culture medium is minute in comparison with the volume of the culturing vessel and the fermentation requires a very long period and there are various difficulties in the fermentation control. Thus, neither of the aforementioned processes can be said to be satisfactory for the production of citric acid.

Reports on researches wherein attempts have been made to apply the submerged culture process to citric acid fermentation have been found. However, those reports do not suggest any proper means for controlling the fermentation conditions but only suggest the difficulty of the submerged fermentation by citric acid producing strains. Only a few of these reports even indicate laboratory success with a synthetic culture medium. However, such processes are economically and technically unsuitable and can never be established as industrial processes for the production of citric acid.

The cultivation under submerged condition is the most improved industrial culture process of microorganisms today. As the result of our various researches, we have succeeded in the isolation of new strains of microorganisms belonging to the genus Penicillium and adaptable to the production of citric acid by submerged culture.

According to the reports hitherto made by many researchers, the production and accumulation of citric acid is critically dependent upon the inorganic salt content of the culture medium. The principal salts involved are those of manganese, magnesium, zinc, iron, phosphorus and the like. Therefore in citric acid fermentation wherein the culture medium is composed of raw material such as molasses or raw sugar, a preliminary treatment, such as the removal of inorganic substances by ion exchange or the addition of inhibitors, such as sodium fluoride, potassium ferrocyanide, potassium ferricyanide, arsenic trioxide, morpholine and methanol has been considered indispensable. However, according to the instant process wherein the new strains belonging to the genus Penicillium are used, the conventional preliminary treatments are useless. This is a new and remarkable industrial process, using untreated molasses or raw sugar as a sugar material for the production of citric acid.

The new strains capable of being used in this invention are two strains called *Penicillium janthinellum* Biourge var. *kuensanii* Kinoshita, Tanaka and Akita (ATCC No. 13154), and *Penicillium restrictum* Gilman and Abbott var. *kuensanii* Kinoshita, Tanaka and Akita (ATCC No. 13155), which strains have been recently isolated by us.

The present strains are isolated from soil. A small amount of sampled soil is suspended fully in sterile water, and cultured on agar plate at 28° C. for 2 or 3 days, and among the colonies on the plate, our present culture was isolated by pure culture technique. The culture medium used for this technique was Bennett's or Czapek's medium.

The characteristics of aforesaid new strains isolated by us shall be described as follows. The experimental tests were carried out according to the description in the "Manual of the Penicillia" by Raper and Thom, published in 1949 by The Williams & Wilkins Company.

(1) The microbiological features of said *Penicillium janthinellum* Biourge var. *kuensanii* Kinoshita, Tanaka and Akita are as follows:

A(1) Colony characteristics on the 10th day of cultivation on Czapek agar at 28° C.

Rate of growth: Spreading broadly, attaining a diameter of 40 to 50 mm.

Surface texture: Appearing floccose, but partially funicles.

Character of surface: Slightly buckled at center, and radially furrowed, lightly zonate.

Colony color and color change: Variously colored from the development of conidial areas, mostly in grayish green shade, pale yellowish brown, becoming similar shades or light brownish white.

Colony reverse: Colorless or very lightly pinkish yellow.

Exudate: Limited or abundant, red clear, partially colorless.

Pigmentation of substratum: None.

Odor: Faint, moldy.

A(2) Microscopic characteristics on the 10th day of cultivation on Czapek agar at 28° C.

Penicilli: Varying in size and complexity, ranging from single terminal verticils of sterigmata (appearing monoverticillate) to asymmetric structures, divaricate, assumed to be asymmetrica-divaricate.

Conidiophore: Arising mostly from the aerial hyphae, but rarely from the substratum hyphae, irregularly branched, with smooth wall, 50 to 25µ or less in length.

Metulae: Divergent, 2 to 4 in verticil, 3 to 10µ x 2µ.

Sterigmata: Mostly in compact clusters up to 4 to 6, occasionally less in number, tapering gradually from the base enlarged, 6 to 8µ x 2µ.

Conidia: Globose or subglobose, finally roughened, 2.0 to 2.5µ in diameter.

Conidial chain: Not adhering in long chains up to 50µ in length, divergent.

Sclerotia, perithecia: Not found.

B(1) Colony characteristics on the 10th day cultivation on Steep agar at 28° C.

Somewhat more rapidly than on Czapek agar, often more intensely colored with the shades present on Czapek more accentuated.

B(2) Microscopic characteristics on the 10th day cultivation on Steep agar at 28° C.

Substantially same as on Czapek agar.

Because of the branches of penicilli are somewhat intermediary of monoverticillata or asymmetrica, therefore it is not certain whether the strain belongs to the former or the latter. After repeated observations, the conclusion was made that the present strain can be included in asymmetrica-divaricata section, and more specifically to *P. janthinellum* series because of the following characteristics of the strain.

(1) Colonies: floccose-funiculose
(2) Sterigmata: tapering
(3) Penicilli: variously branched and ranging single sterigmata to asymmetric structures There are seven species listed in *P. janthinellum* series:

(1) *P. dalae* Zaleski
    (2) *P. janthinellum* Biourge
    (3) *P. simplicissimum* Thom
    (4) *P. ochro-chloron* Biourge
    (5) *P. piscarium* Westling
    (6) *P. miczynskii* Zaleski
    (7) *P. goldewskii* Zaleski They respectively differ from the present strain in the following points.

(1) Rather delicate basal felt; no exudate; strigmata 8–12μ; conidia elliptical to subglobose, coarse roughnings in spirally arranged bands or bars
(2) Conidia strongly elliptical when formed
(3) Surface texture velvety; conidiophore 200–800μ; conidia elliptical
(4) Reverse shade buff to flesh color; conidiophore 300 to 500μ finely or conspicuously roughened; conidia elliptical
(5) Color of surface grayish olive; margins thin; conidia elliptica, conspicuously echinulate
(6) Rate of growth 30 to 35 mm. in 10 days; exudate pale yellow, surrounding agar colored in bright yellow to yellow orange
(7) Rate of growth 25 to 30 mm. in 10 days; surface texture definitely funiculous; conidia olive green in mass The present strain resembles *P. janthinellum* Biourge but it can be discriminated from the present strain on having strongly elliptical conidia and color of colony, and there has not been recognized the productivity of citric acid of *janthinellum* Biourge. Therefore the present strain can be adequately recognized as a variety of *P. janthinellum* Biourge and named "*P. janthinellum* biourge var. *kuensanii* Kinoshita, Tanaka and Akita."

(2) The microbiological features of said *Penicillium restrictum* Gilman and Abbott var. *kuensanii* Kinoshita, Tanaka and Akita are as follows:

A(1) Colony characteristics on the 10th day of cultivation on Czapek agar at 28° C.

Rate of growth: Growing rather restrictedly attaining a diameter of 20 to 25 mm.

Surface texture: Floccose.

Character of surface: Radially wrinkled and irregularly sulcate, aerial hyphae loosely crowded at center.

Character of margin: White, compact.

Colony color and color change: Grayish green to brownish green.

Colony reverse: Colorless to pale yellow.

Exudate: Lack or limited.

Pigmentation of substratum: None.

Odor: Faint moldy.

A(2) Microscopic characteristics on the 10th day of cultivation on Czapek agar at 28° C.

Penicilli: Monoverticillate, occasionally once or twice branched.

Conidiophore: Arising mostly from aerial hyphae, apices enlarged, with smooth wall, 20 to 100μ in length.

Sterigmata: Divergent in small clusters up to 6 to 8 in number, 5.0 to 7.5μ x 2μ.

Conidia: Globose or subglobose, finely roughened or smooth, 2.0 to 2.5μ in diameter.

Conidial chain: Divergent or loosely paralleled, not long, up to 30 to 50μ in length.

Perithecia, sclerotia: Not found.

B(1) Colony characteristics on the 10th day cultivation on Steep agar at 28° C. and B(2) Microscopic characteristics on the 10th day cultivation on Steep agar at 28° C.

Growing somewhat more rapidly than on Czapek agar, substantially same as on Czapek agar.

The present strain is characterized by (a) Not producing sclerotia or perithecia
    (b) Conidiophore generally unbranched
    (c) Colonies floccose-funiculose
    (d) Colonies predominantly floccose and seems to belong to *P. restrictum* series. The series has the following two strains (1) *P. restrictum* Gilman and Abbott
    (2) *P. fuscum* (Sopp) n. Comb The present strain fundamentally differs from the strain No. 2 in the point that the texture of the surface of the No. 2 is spongy or fleshy; penicilli variable, ranging from fragmentary to strictly monoverticillate to irregularly branched; conidiophore comparatively heavy, light yellow-brown in color; conidia spinulose dark colored; but slightly differs from the strain No. 1 in conidia, which of No. 1 is conspicuously roughened. There can be seen no other identical strains, therefore it is considered that the present strain is a variety of *P. restrictum* Gilman and Abbott. The present strain can accumulate a lot of citric acid, as herein described, but there has never been recognized productivity of citric acid by the members of the series. Therefore, the present strain is adequately considered to be a variety of *P. restrictum* Gilman and Abbott and names "*P. restrictum* Gilman and Abbott var. *kuensanii* Kinoshita, Tanaka and Akita."

According to "Manual of the Penicillia" by Raper and Thom, strains which can produce citric acid are listed as follows:

(1) *P. frequentans* Westling
    (2) *P. spuinulosum* Thom
    (3) *P. implicatum* Biourge
    (4) *P. javanicum* van Beijima
    (5) *P. roseopurpureum* Dierckx
    (6) *P. citreoviride* Biourge
    (7) *P. jenseni* Zaleski
    (8) *P. nigricans* Thom
    (9) *P. kapuscinskii* Zaleski
    (10) *P. citrinum* Thom
    (11) *P. digitatum* Saccarodo
    (12) *P. expansum* Link
    (13) *P. luteum* Zukal
    (14) *P. purpurogenum* Stoll
    (15) *Paecilomyces varioti* Bainier These strains are taxonomically different from *P. restrictum* and *P. janthinellum* above mentioned. For example, *P. restrictum* Gilman and Abbott var. *kuensanii* Kinoshita, Tanaka and Akita differs with each of the strain Nos. 7–15 in the point that penicilli of the former is monoverticillate; differs with each of the strain Nos. 1–3 in the points of surface texture and conidiophore; differs with the strain No. 4 in the point of production of perithecia; differs with each of the strain Nos. 5 and 6 in the points of surface texture, growth rate and conidiophore. *P. janthinellum* Biourge var. *kuensanii* Kinoshita, Tanaka and Akita differs from each of the strain Nos. 1-6 and 10-15 in the point that penicilli of the former are asymmetric divaricate; differs with the strain No. 7 in the points of growth rate, surface color and conidial chain; differs with each of the strain Nos. 8 and 9 in the points of color of conidia, reverse shade and growth rate, particularly the strain Nos. 8 and 9 lack in sterigmata of taper form which is unique for the former strain.

In citric acid fermentation it has been considered essential that the pH of the culture medium during fermentation should be kept on the acidic side in order to prevent the production of by-products such as oxalic acid, gluconic acid, etc., and it has been also believed that, if the pH is kept in the neighborhood of neutrality by adding calcium carbonate or the like, the production of the above mentioned by-products increases and the yield of citric acid decreases. However, according to the present invention, the addition of calcium carbonate to the culture medium not only does not cause the production of the above mentioned by-product acids but also effectively increases the yield of citric acid.

Various conventional processes can be applied to the recovery of citric acid from the culturing medium after completion of the fermentation. For example, when calcium carbonate is used as an ingredient of the medium, sulfuric acid is added to the fermented broth and any insoluble solids (consisting chiefly of mycelium and calcium sulfate) are filtered off. The filtrate is then treated with activated carbon to remove the impurities, and dried at about 80° C., crude citric acid thus being obtained. Alternatively, a calculated amount of calcium hydroxide may be added to the filtrate (which has been treated with activated carbon) so as to recover the citric acid as insoluble calcium citrate. It is also possible to add hydrochloric acid to the culturing liquid to separate and dissolve the citric acid, to remove solids, such as mycelium and the like, treat the filtrate with activated carbon, add concentrated aqueous ammonia thereto to make the pH 7.5–8.0 and boil it to recover the insoluble calcium citrate.

The present invention will be illustrated by way of examples as follows:

*Examples 1 to 4*

Examples of submerged culture in a shake flask. 250 ml. Erlenmeyer flasks each charged with 30 ml. of a sterilized culture medium are placed on rotary shaking devices of 5 cm. amplitude, are rotated at 220 r.p.m. and cultured in a constant temperature room at 28° C.

Strain used: *Penicillium restrictum* Gilman and Abbott var. *kuensanii* Kinoshita, Tanaka and Akita (ATCC No. 13155).

| Example | Culture medium | Percent by weight of total |
|---|---|---|
| 1 | Refined white sugar | 16.5 (equivalent to 15% by weight of glucose). |
| | NH$_4$NO$_3$ | 0.2. |
| | MgSO$_4$·7H$_2$O | 0.25. |
| | KH$_2$PO$_4$ | 0.1. |
| | CaCO$_3$ | 6.0. |
| | Water | the balance. |
| 2 | Raw sugar | 18 (equivalent to 15% by weight of glucose). |
| | NH$_4$NO$_3$ | 0.2. |
| | MgSO$_4$·7H$_2$O | 0.25. |
| | KH$_2$PO$_4$ | 0.1. |
| | CaCO$_3$ | 6.0. |
| | Water | the balance. |
| 3 | Beet molasses | 30 (equivalent to 15% by weight of glucose). |
| | NH$_4$NO$_3$ | 0.1. |
| | CaCO$_3$ | 7.0. |
| | Water | the balance. |
| 4 | Black strap molasses | 33 (equivalent to 20% by weight of glucose). |
| | NH$_4$NO$_3$ | 0.1. |
| | CaCO$_3$ | 10.0. |
| | Water | the balance. |

Results of analysis (on the 10th day of cultivation):

| Example | pH at starting | Yield of citric acid (to consumed sugar), percent |
|---|---|---|
| 1 | 7.20 | 60.5 |
| 2 | 7.40 | 62.0 |
| 3 | 7.25 | 81.3 |
| 4 | 7.30 | 78.5 |

*Example 5*

Example of submerged culture in aerated stirring tank of 5 liters volume.

Strain used: *Penicillium janthinellum* Biourge var. *kuensanii* Kinoshita, Tanaka and Akita (ATCC No. 13154).

Process employed: A suspension of mycelia cultured under shaking condition for 66 hours in advance is added in an amount of 10% (by volume) to the broth.

The culturing conditions:
Number of revolutions of the stirrer: 540 r.p.m.,
Amount of aeration: 1 liter/liter/minute,
Amount of the culture medium: 3 liters,
Temperature: 28° C.

| Culture medium | Example 5 |
|---|---|
| Black strap molasses | 25 (percent by weight). |
| NH$_4$NO$_3$ | 0.1 (percent by weight). |
| CaCO$_3$ | 7.0 (percent by weight). |
| Water | the balance. |

Results of analysis (on the 8th day of cultivation):
pH at starting _____ 7.20
Yield of citric acid (to consumed sugar) _percent__ 79.3

*Examples 6 to 8*

Examples of submerged culture in 200 liter tanks.

Strain used: *Penicillium restrictum* Gilman and Abbott var. *kuensanii* Kinoshita, Tanaka and Akita (ATCC No. 13155).

Process employed: The same as in Example 5, a suspension of mycelia cultured under shaking condition for 66 hours in advance is added as seed in an amount of 10% (by volume) to the culture medium.

The operating conditions of the tank:
Number of revolutions of the stirrer: 230 r.p.m.
Amount of aeration: 1 liter/liter/minute.
Total amount of the culture medium: 100 liters.
Temperature: 28° C.

Compositions of the culture medium are as follows:

| Culture medium | Example 6 (percent by weight) | Example 7 (percent by weight) | Example 8 (percent by weight) |
|---|---|---|---|
| Black strap molasses | 17 | 25 | 33 |
| NH$_4$NO$_3$ | 0.3 | 0.2 | 0.1 |
| CaCO$_3$ | 6.0 | 8.0 | 10.0 |
| Water | the balance | the balance | the balance |

Results of analysis (on the 7th day of cultivation):

| Example | pH at starting | Yield of citric acid (to consumed sugar), percent |
|---|---|---|
| 6 | 7.25 | 82.0 |
| 7 | 7.20 | 76.5 |
| 8 | 7.20 | 72.3 |

It is thought that the invention and its advantages will be understood from the foregoing description and it is apparent that various changes may be made in the process without departing from the spirit and scope of the invention or sacrificing its material advantages, the process hereinbefore described being merely preferred embodiments of the invention.

We claim:

1. A process for the production of citric acid by fermentation which comprises culturing a microorganism of the class consisting of *Penicillium janthinellum* Biourge var. *kuensanii* Kinoshita, Tanaka and Akita and *Penicillium restrictum* Gilman and Abbott var. *kuensanii* Kinoshita, Tanaka and Akita in an aqueous medium containing untreated sugar material, nitrogen source and inorganic salt under submerged conditions, whereby citric acid is produced in the medium, and recovering the same.

2. A process according to claim 1 wherein the aqueous medium contains a sufficient amount of calcium carbonate to adjust the pH of said medium to a value of about 6 during fermentation.

3. A process according to claim 2 wherein the amount of untreated sugar material is equivalent to from about 15 to about 20 percent by weight of glucose based on the total weight of the culture medium.

4. A process according to claim 3 wherein the untreated sugar material is black strap molasses.

5. A process according to claim 3 wherein the untreated sugar material is beet molasses.

6. A process according to claim 3 wherein the untreated sugar material is raw sugar.

References Cited in the file of this patent

UNITED STATES PATENTS

| 1,679,186 | Szucs | July 31, 1928 |
| 2,492,673 | Woodward et al. | Dec. 23, 1949 |
| 2,674,561 | Moyer | Apr. 6, 1954 |

OTHER REFERENCES

"Chemical Activities of Fungi," by J. W. Foster, Academic Press Inc., New York (1949), pages 395 to 397 relied on.

"A Manual of the Penicillia," by Raper et al., The Williams & Wilkins Company, Baltimore (1949), pages 18, 153, 188–189, 645–646 and 693 relied on.